N. W. SPAULDING.
Setting Teeth in Saws.

No. 33,270.

2 Sheets—Sheet 1.

Patented Sept. 10, 1861.

Witnesses:
Samuel Cross.
J. F. Marshall.

Inventor:
Nathan W. Spaulding.

N. W. SPAULDING.
Setting Teeth in Saws.

No. 33,270.

2 Sheets—Sheet 2.

Patented Sept. 10, 1861.

Witnesses:
Samuel Cross.
J. B. Marshall.

Inventor:
Nathan W. Spaulding

UNITED STATES PATENT OFFICE.

NATHAN W. SPAULDING, OF SACRAMENTO, CALIFORNIA.

IMPROVEMENT IN SAWS.

Specification forming part of Letters Patent No. 33,270, dated September 10, 1861.

*To all whom it may concern:*

Be it known that I, NATHAN W. SPAULDING, of the city and county of Sacramento, in the State of California, have invented a new and improved method of setting teeth and other metallic substances in saws and saw-plates so as to prevent the plate from splitting or cracking; and I do hereby declare that the following is a full and exact description thereof, reference being had to the accompanying drawings, and to the letters of reference marked thereon.

The nature of my invention consists in providing the saw or saw-plate with teeth or other pieces set therein on circular lines instead of angular where the power is applied, whereby the pressure is distributed in equal proportions on the saw or saw-plate, and the danger of splitting, cracking, or breaking is entirely removed.

To enable others skilled in the art to make and use my invention, I will proceed to describe its construction and operation.

I construct my saw or saw-plate in any of the known forms, and fit and apply thereto teeth and other pieces necessary with circular lines instead of angular at the base or other places therein where the pressure or force applies, and in order to obviate the danger arising from the saw or plate splitting, cracking, or breaking at the place where the tooth or other piece is set in the saw or saw-plate (as generally is the case when set therein by angular lines) I set the tooth or other piece in the saw or saw-plate with circular lines, as shown at D D in the accompanying drawings, wherein—

Letter A is a perspective view of a circular saw-plate.

Letters B are perspective views of sections of a circular saw-plate.

Letters C are perspective views of teeth to be set in the saw or saw-plate.

Letters D are perspective views of the circular lines in the saw or saw-plate at the base of the teeth, where the pressure applies and where the plate usually splits, cracks, or breaks, and letter E represents a smooth rivet or key to fasten the tooth or other piece in the saw-plate.

In the saw or saw-plate wherein the tooth or other piece is to be set a "gain," with a beveling tongue on the inside and around the edge and a semicircular hole for a key on the lifting side, is to be made as represented in Figure 4, letters D D, the line at the points D D being circular instead of angular.

Figure 1:
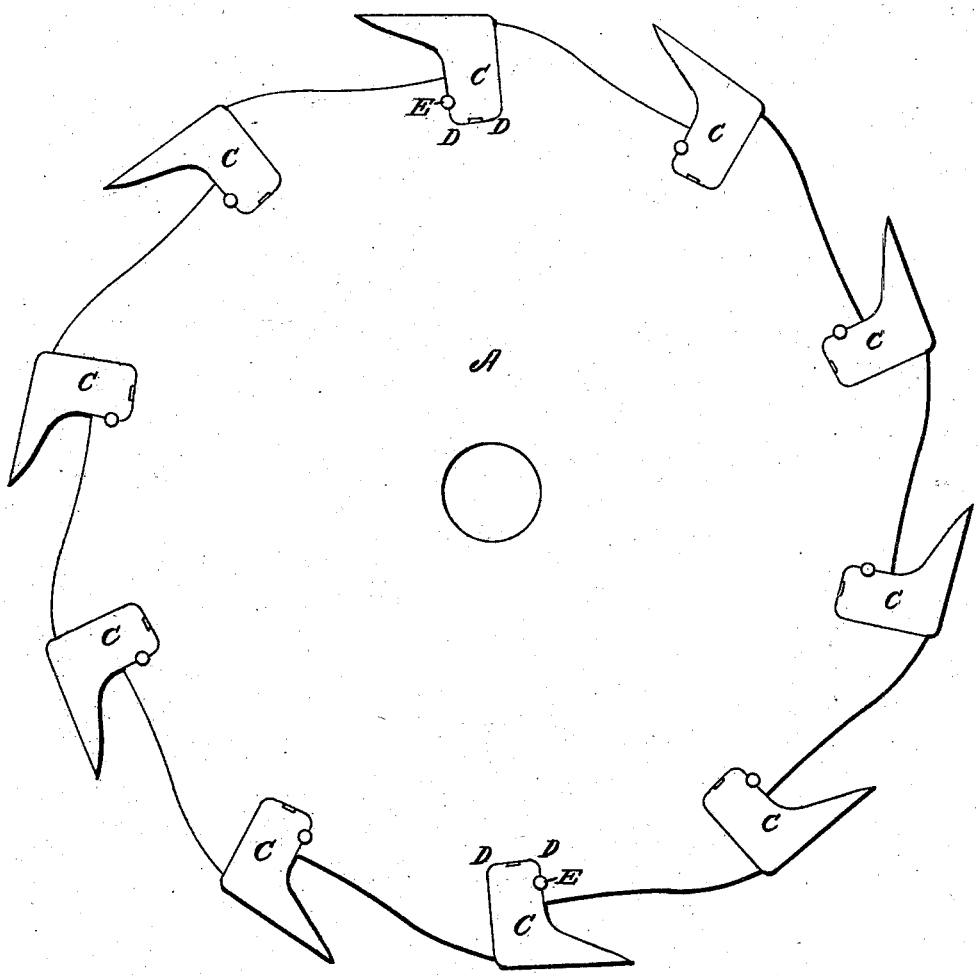
Figure 2:
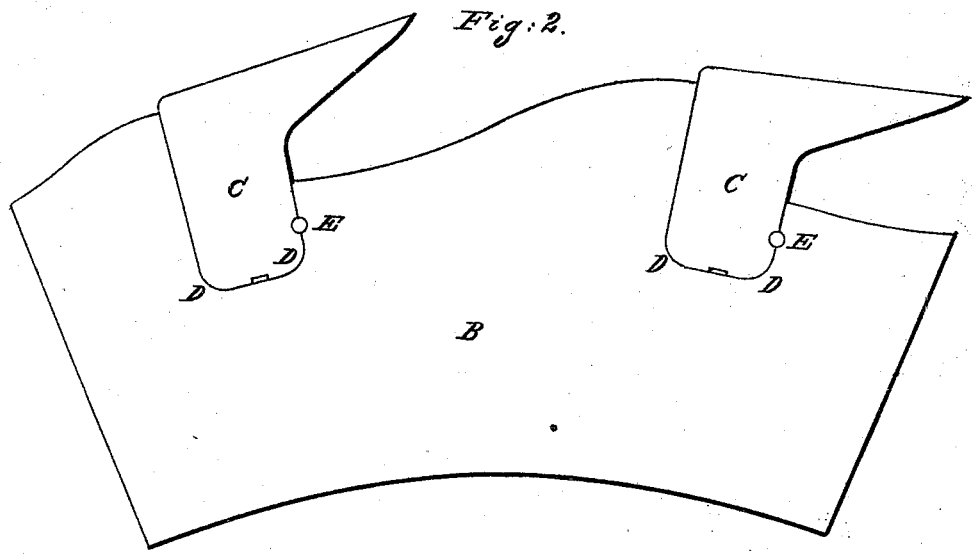
Figures 2, 3:
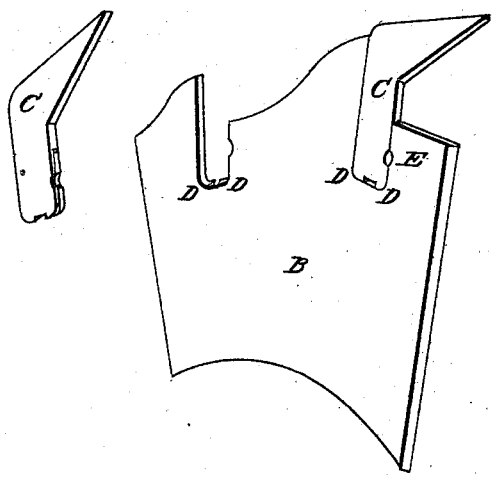

The tooth, as represented in Fig. 3, letter C, is to be made with a beveling groove on the outside or edge with a semicircular hole on the lifting side corresponding with the hole in the gain, represented in Fig. 4 at letter E, by which, with a rivet, to fasten the tooth in the saw-plate.

All the corresponding parts of the tooth to be inserted in the gain are to be fitted therein with exactness and precision and fastened with a rivet, as above described.

What I claim as my invention, and desire to secure by Letters Patent, is—

The application and use of circular instead of angular lines in setting teeth or other pieces in saw-plates and saws, which will prevent the plate or saw from splitting, cracking, or breaking at the corners where pressure and force usually apply, thereby distributing the pressure or force equally on the plate instead of its being limited to one spot, as would be the case where angular lines are used, using therefor the saw-plate, teeth, and other pieces, as above described, which will produce the intended effect.

NATHAN W. SPAULDING.

Witnesses:
SAMUEL CROSS,
T. B. MARSHALL.